United States Patent
Kim et al.

(10) Patent No.: US 12,369,069 B2
(45) Date of Patent: Jul. 22, 2025

(54) METHOD FOR TRANSMITTING PREFERRED LINK INFORMATION

(71) Applicant: LG ELECTRONICS INC., Seoul (KR)

(72) Inventors: Jeongki Kim, Seoul (KR); Jinsoo Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 416 days.

(21) Appl. No.: 18/000,208

(22) PCT Filed: Apr. 30, 2021

(86) PCT No.: PCT/KR2021/005503
§ 371 (c)(1),
(2) Date: Nov. 29, 2022

(87) PCT Pub. No.: WO2021/246656
PCT Pub. Date: Dec. 9, 2021

(65) Prior Publication Data
US 2023/0209391 A1    Jun. 29, 2023

(30) Foreign Application Priority Data

Jun. 1, 2020 (KR) .......... 10-2020-0065937
Jun. 4, 2020 (KR) .......... 10-2020-0067747

(51) Int. Cl.
*H04W 28/02* (2009.01)
*H04W 72/23* (2023.01)
(Continued)

(52) U.S. Cl.
CPC ....... *H04W 28/0252* (2013.01); *H04W 72/23* (2023.01); *H04W 76/15* (2018.02); *H04W 84/12* (2013.01)

(58) Field of Classification Search
None
See application file for complete search history.

(56) References Cited

U.S. PATENT DOCUMENTS

2021/0352722 A1* 11/2021 Xin .................. H04L 1/08
2021/0377856 A1* 12/2021 Chu .................. H04W 52/0216
(Continued)

FOREIGN PATENT DOCUMENTS

| KR | 2016-0141560 | 12/2016 |
| WO | 2010-134737 | 11/2010 |
| WO | 2020-040589 | 2/2020 |

OTHER PUBLICATIONS

PCT International Application No. PCT/KR2021/005503, International Search Report dated Jul. 30, 2021, 4 page.
(Continued)

*Primary Examiner* — Alpus Hsu
(74) *Attorney, Agent, or Firm* — LEE, HONG, DEGERMAN, KANG & WAIMEY

(57) ABSTRACT

In a wireless local area network (WLAN) system, a multi-link single radio (MLSR) station (STA) is an STA that cannot perform transmission and reception simultaneously on different links, and the MLSR STA may comprise a first receiving unit and a second receiving unit. The MLSR STA may transmit preferred link information related to a second link to an access point (AP) multi-link device (MLD) on a first link. The MLSR STA may receive an initial control frame from the AP MLD through the first receiving unit on the second link. The MLSR STA may receive a data frame from the AP MLD through the first and second receiving units on the second link.

14 Claims, 18 Drawing Sheets

(51) Int. Cl.
*H04W 76/15* (2018.01)
*H04W 84/12* (2009.01)

(56) References Cited

U.S. PATENT DOCUMENTS

2022/0029736 A1* 1/2022 Chu ...................... H04L 1/0023
2022/0070791 A1* 3/2022 Kim .................... H04W 52/367
2022/0279375 A1* 9/2022 Kim ................. H04W 28/0263

OTHER PUBLICATIONS

Khorov et al., "Current Status and Directions of IEEE 802.11be, the Future Wi-Fi 7," IEEE Access, May 2020, 27 pages.
Wang et al., "Discussion on Multi-link Operations," IEEE 802.11-19/1213r0, Jul. 2019, 12 pages.
European Patent Office Application Serial No. 21818338.2, Search Report dated Apr. 25, 2024, 11 pages.
Park et al., "Enhanced Multi-Link Single Radio Operation," IEEE 802.11-20/0562r1, May 2020, 14 pages.

\* cited by examiner (a)

| AID TIA Info | Block Ack Starting Sequence Control | Block Ack Bitmap |
|---|---|---|

Octets:      2                0 or 2            0, 4, 8, 16 or 32

FIG. 13

| B0 | B10 | B11 | B13 | B14 | B15 |

| AID 11 (e.g., = 2044) | Preferred link bitmap | Reserved |
|---|---|---|
| 11 | 3 | 2 |

Bits:

AID Preferred link bitmap Info subfield format

METHOD FOR TRANSMITTING PREFERRED LINK INFORMATION

CROSS-REFERENCE TO RELATED APPLICATION(S)

This application is the National Stage filing under 35 U.S.C. 371 of International Application No. PCT/KR2021/005503, filed on Apr. 30, 2021, which claims the benefit of earlier filing date and right of priority to Korean Application Nos. 10-2020-0065937, filed on Jun. 1, 2020, and 10-2020-0067747, filed on Jun. 4, 2020, the contents of which are all hereby incorporated by reference herein in their entireties.

TECHNICAL FIELD

The present specification relates to a method for transmitting preferred link information by a multi-link single radio (MLSR) STA in a wireless local area network (WLAN) system.

BACKGROUND

A wireless local area network (WLAN) has been enhanced in various ways. For example, the Institute of Electrical and Electronics Engineers (IEEE) 802.11ax standard has proposed an enhanced communication environment by using orthogonal frequency division multiple access (OFDMA) and downlink multi-user multiple input multiple output (DL MU MIMO) schemes.

The present specification proposes a technical feature that can be utilized in a new communication standard. For example, the new communication standard may be an extreme high throughput (EHT) standard which is currently being discussed. The EHT standard may use an increased bandwidth, an enhanced PHY layer protocol data unit (PPDU) structure, an enhanced sequence, a hybrid automatic repeat request (HARD) scheme, or the like, which is newly proposed. The EHT standard may be called the IEEE 802.11be standard.

SUMMARY

In a Wireless Local Area Network (WLAN) system according to various embodiments, a multi-link single radio (MLSR) station (STA) may be incapable of transmitting and receiving simultaneously in different links, and the MLSR STA may include a first receiver and a second receiver. The MLSR STA may transmit preferred link information related to the second link to an access point (AP) multi-link device (MLD) in a first link. The MLSR STA may receive an initial control frame from the AP MLD through the first receiver in the second link. The MLSR STA may receive a data frame from the AP MLD through the first and second receivers in the second link.

According to an example of the present specification, an MLSR STA may include a plurality of receivers and may perform monitoring for initial control frame reception in a plurality of links. When an initial control frame is received on one link, all receivers can receive data on the corresponding link.

According to an example of the present specification, the MLSR STA may transmit preferred link information, and the AP may select a more appropriate link in consideration of the receiving side's situation.

BRIEF DESCRIPTION OF THE DRAWINGS

FIG. 10 to FIG. 12 show an embodiment of a method in which preferred link information is included in Multi-STA Block Ack.

FIG. 13 is a diagram illustrating an embodiment of an AID TID Info field.

DETAILED DESCRIPTION

Figure 1:
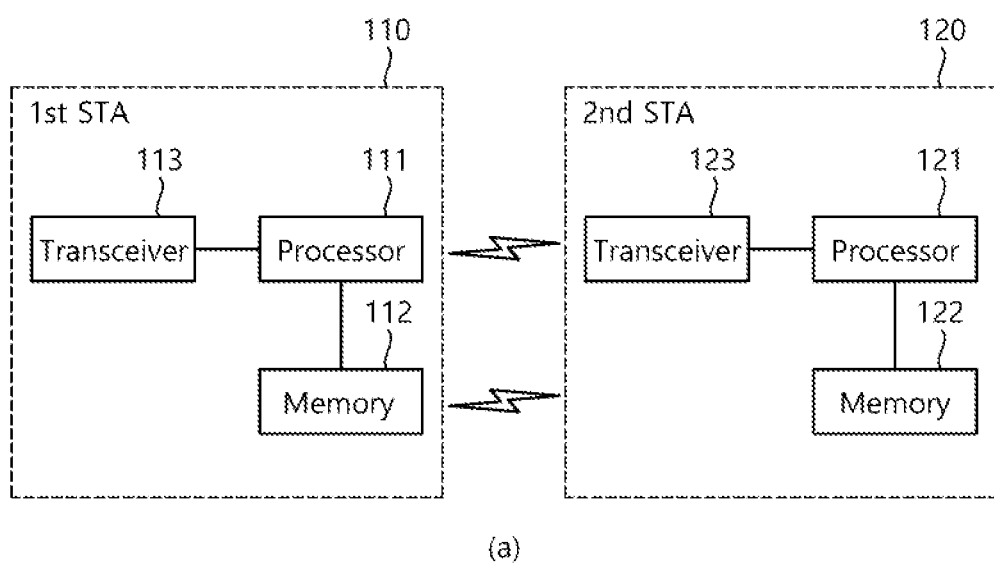
FIG. 1 shows an example of a transmitting apparatus and/or receiving apparatus of the present specification.
Figure 1:
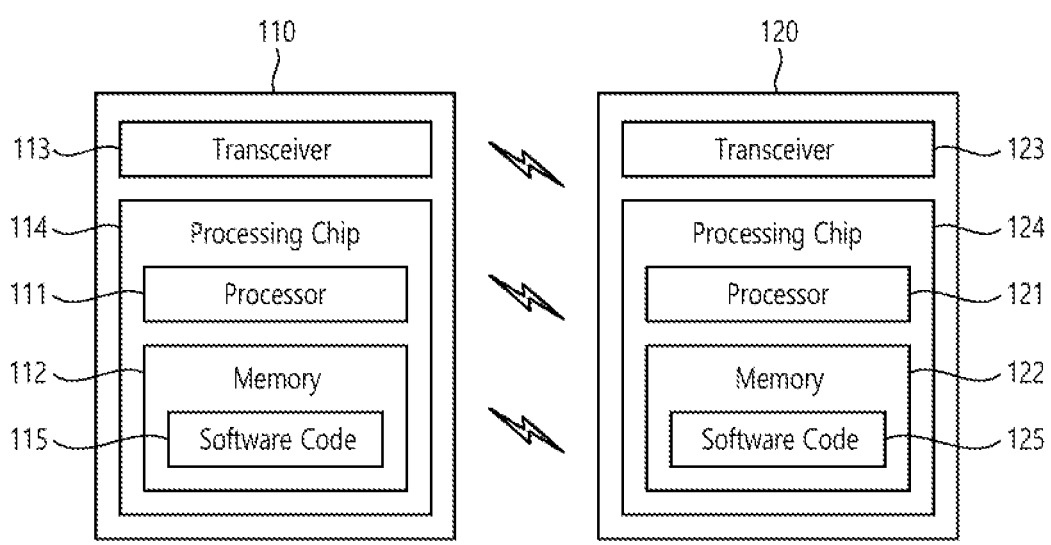

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (EHT-signal)", it may mean that "EHT-signal" is proposed as an example of the "control information". In other words, the "control information" of the present specification is not limited to "EHT-signal", and "EHT-signal" may be proposed as an example of the "control information". In addition, when indicated as "control information (i.e., EHT-signal)", it may also mean that "EHT-signal" is proposed as an example of the "control information".

Technical features described individually in one figure in the present specification may be individually implemented, or may be simultaneously implemented.

The following example of the present specification may be applied to various wireless communication systems. For example, the following example of the present specification may be applied to a wireless local area network (WLAN) system. For example, the present specification may be applied to the IEEE 802.11a/g/n/ac standard or the IEEE 802.11ax standard. In addition, the present specification may also be applied to the newly proposed EHT standard or IEEE 802.11be standard. In addition, the example of the present specification may also be applied to a new WLAN standard enhanced from the EHT standard or the IEEE 802.11be standard. In addition, the example of the present specification may be applied to a mobile communication system. For example, it may be applied to a mobile communication system based on long term evolution (LTE) depending on a 3rd generation partnership project (3GPP) standard and based on evolution of the LTE. In addition, the example of the present specification may be applied to a communication system of a 5G NR standard based on the 3GPP standard.

Hereinafter, in order to describe a technical feature of the present specification, a technical feature applicable to the present specification will be described.

FIG. 1 shows an example of a transmitting apparatus and/or receiving apparatus of the present specification.

In the example of FIG. 1, various technical features described below may be performed. FIG. 1 relates to at least one station (STA). For example, STAs 110 and 120 of the present specification may also be called in various terms such as a mobile terminal, a wireless device, a wireless transmit/receive unit (WTRU), a user equipment (UE), a mobile station (MS), a mobile subscriber unit, or simply a user. The STAs 110 and 120 of the present specification may also be called in various terms such as a network, a base station, a node-B, an access point (AP), a repeater, a router, a relay, or the like. The STAs 110 and 120 of the present specification may also be referred to as various names such as a receiving apparatus, a transmitting apparatus, a receiving STA, a transmitting STA, a receiving device, a transmitting device, or the like.

For example, the STAs 110 and 120 may serve as an AP or a non-AP. That is, the STAs 110 and 120 of the present specification may serve as the AP and/or the non-AP. In the present specification, the AP may be indicated as an AP STA.

The STAs 110 and 120 of the present specification may support various communication standards together in addition to the IEEE 802.11 standard. For example, a communication standard (e.g., LTE, LTE-A, 5G NR standard) or the like based on the 3GPP standard may be supported. In addition, the STA of the present specification may be implemented as various devices such as a mobile phone, a vehicle, a personal computer, or the like. In addition, the STA of the present specification may support communication for various communication services such as voice calls, video calls, data communication, and self-driving (autonomous-driving), or the like.

The STAs 110 and 120 of the present specification may include a medium access control (MAC) conforming to the IEEE 802.11 standard and a physical layer interface for a radio medium.

The STAs 110 and 120 will be described below with reference to a sub-figure (a) of FIG. 1.

The first STA 110 may include a processor 111, a memory 112, and a transceiver 113. The illustrated process, memory, and transceiver may be implemented individually as separate chips, or at least two blocks/functions may be implemented through a single chip.

The transceiver 113 of the first STA performs a signal transmission/reception operation. Specifically, an IEEE 802.11 packet (e.g., IEEE 802.11a/b/g/n/ac/ax/be, etc.) may be transmitted/received.

For example, the first STA 110 may perform an operation intended by an AP. For example, the processor 111 of the AP may receive a signal through the transceiver 113, process a reception (RX) signal, generate a transmission (TX) signal, and provide control for signal transmission. The memory 112 of the AP may store a signal (e.g., RX signal) received through the transceiver 113, and may store a signal (e.g., TX signal) to be transmitted through the transceiver.

For example, the second STA 120 may perform an operation intended by a non-AP STA. For example, a transceiver 123 of a non-AP performs a signal transmission/reception operation. Specifically, an IEEE 802.11 packet (e.g., IEEE 802.11a/b/g/n/ac/ax/be packet, etc.) may be transmitted/received.

For example, a processor 121 of the non-AP STA may receive a signal through the transceiver 123, process an RX signal, generate a TX signal, and provide control for signal transmission. A memory 122 of the non-AP STA may store a signal (e.g., RX signal) received through the transceiver 123, and may store a signal (e.g., TX signal) to be transmitted through the transceiver.

For example, an operation of a device indicated as an AP in the specification described below may be performed in the first STA 110 or the second STA 120. For example, if the first STA 110 is the AP, the operation of the device indicated as the AP may be controlled by the processor 111 of the first STA 110, and a related signal may be transmitted or received through the transceiver 113 controlled by the processor 111 of the first STA 110. In addition, control information related to the operation of the AP or a TX/RX signal of the AP may be stored in the memory 112 of the first STA 110. In addition, if the second STA 120 is the AP, the operation of the device indicated as the AP may be controlled by the processor 121 of the second STA 120, and a related signal may be transmitted or received through the transceiver 123 controlled by the processor 121 of the second STA 120. In addition, control information related to the operation of the AP or a TX/RX signal of the AP may be stored in the memory 122 of the second STA 120.

For example, in the specification described below, an operation of a device indicated as a non-AP (or user-STA) may be performed in the first STA 110 or the second STA 120. For example, if the second STA 120 is the non-AP, the operation of the device indicated as the non-AP may be controlled by the processor 121 of the second STA 120, and a related signal may be transmitted or received through the transceiver 123 controlled by the processor 121 of the second STA 120. In addition, control information related to the operation of the non-AP or a TX/RX signal of the non-AP may be stored in the memory 122 of the second STA 120. For example, if the first STA 110 is the non-AP, the operation of the device indicated as the non-AP may be controlled by the processor 111 of the first STA 110, and a related signal may be transmitted or received through the transceiver 113 controlled by the processor 111 of the first STA 110. In addition, control information related to the operation of the non-AP or a TX/RX signal of the non-AP may be stored in the memory 112 of the first STA 110.

In the specification described below, a device called a (transmitting/receiving) STA, a first STA, a second STA, an STA1, an STA2, an AP, a first AP, a second AP, an AP1, an AP2, a (transmitting/receiving) terminal, a (transmitting/receiving) device, a (transmitting/receiving) apparatus, a network, or the like may imply the STAs 110 and 120 of FIG. 1. For example, a device indicated as, without a specific reference numeral, the (transmitting/receiving) STA, the first STA, the second STA, the STA1, the STA2, the AP, the first AP, the second AP, the AP1, the AP2, the (transmitting/receiving) terminal, the (transmitting/receiving) device, the (transmitting/receiving) apparatus, the network, or the like may imply the STAs 110 and 120 of FIG. 1. For example, in the following example, an operation in which various STAs transmit/receive a signal (e.g., a PPDU) may be performed in the transceivers 113 and 123 of FIG. 1. In addition, in the following example, an operation in which various STAs generate a TX/RX signal or perform data processing and computation in advance for the TX/RX signal may be performed in the processors 111 and 121 of FIG. 1. For example, an example of an operation for generating the TX/RX signal or performing the data processing and computation in advance may include: 1) an operation of determining/obtaining/configuring/computing/decoding/encoding bit information of a sub-field (SIG, STF, LTF, Data) included in a PPDU; 2) an operation of determining/configuring/obtaining a time resource or frequency resource (e.g., a subcarrier resource) or the like used for the sub-field (SIG, STF, LTF, Data) included the PPDU; 3) an operation of determining/configuring/obtaining a specific sequence (e.g., a pilot sequence, an STF/LTF sequence, an extra sequence applied to SIG) or the like used for the sub-field (SIG, STF, LTF, Data) field included in the PPDU; 4) a power control operation and/or power saving operation applied for the STA; and 5) an operation related to determining/obtaining/configuring/decoding/encoding or the like of an ACK signal. In addition, in the following example, a variety of information used by various STAs for determining/obtaining/configuring/computing/decoding/decoding a TX/RX signal (e.g., information related to a field/subfield/control field/parameter/power or the like) may be stored in the memories 112 and 122 of FIG. 1.

The aforementioned device/STA of the sub-figure (a) of FIG. 1 may be modified as shown in the sub-figure (b) of FIG. 1. Hereinafter, the STAs 110 and 120 of the present specification will be described based on the sub-figure (b) of FIG. 1.

For example, the transceivers 113 and 123 illustrated in the sub-figure (b) of FIG. 1 may perform the same function as the aforementioned transceiver illustrated in the sub-figure (a) of FIG. 1. For example, processing chips 114 and 124 illustrated in the sub-figure (b) of FIG. 1 may include the processors 111 and 121 and the memories 112 and 122. The processors 111 and 121 and memories 112 and 122 illustrated in the sub-figure (b) of FIG. 1 may perform the same function as the aforementioned processors 111 and 121 and memories 112 and 122 illustrated in the sub-figure (a) of FIG. 1.

A mobile terminal, a wireless device, a wireless transmit/receive unit (WTRU), a user equipment (UE), a mobile station (MS), a mobile subscriber unit, a user, a user STA, a network, a base station, a Node-B, an access point (AP), a repeater, a router, a relay, a receiving unit, a transmitting unit, a receiving STA, a transmitting STA, a receiving device, a transmitting device, a receiving apparatus, and/or a transmitting apparatus, which are described below, may imply the STAs 110 and 120 illustrated in the sub-figure (a)/(b) of FIG. 1, or may imply the processing chips 114 and 124 illustrated in the sub-figure (b) of FIG. 1. That is, a technical feature of the present specification may be performed in the STAs 110 and 120 illustrated in the sub-figure (a)/(b) of FIG. 1, or may be performed only in the processing chips 114 and 124 illustrated in the sub-figure (b) of FIG. 1. For example, a technical feature in which the transmitting STA transmits a control signal may be understood as a technical feature in which a control signal generated in the processors 111 and 121 illustrated in the sub-figure (a)/(b) of FIG. 1 is transmitted through the transceivers 113 and 123 illustrated in the sub-figure (a)/(b) of FIG. 1. Alternatively, the technical feature in which the transmitting STA transmits the control signal may be understood as a technical feature in which the control signal to be transferred to the transceivers 113 and 123 is generated in the processing chips 114 and 124 illustrated in the sub-figure (b) of FIG. 1.

For example, a technical feature in which the receiving STA receives the control signal may be understood as a technical feature in which the control signal is received by means of the transceivers 113 and 123 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (a) of FIG. 1 is obtained by the processors 111 and 121 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (b) of FIG. 1 is obtained by the processing chips 114 and 124 illustrated in the sub-figure (b) of FIG. 1.

Referring to the sub-figure (b) of FIG. 1, software codes 115 and 125 may be included in the memories 112 and 122. The software codes 115 and 126 may include instructions for controlling an operation of the processors 111 and 121. The software codes 115 and 125 may be included as various programming languages.

The processors 111 and 121 or processing chips 114 and 124 of FIG. 1 may include an application-specific integrated circuit (ASIC), other chipsets, a logic circuit and/or a data processing device. The processor may be an application processor (AP). For example, the processors 111 and 121 or processing chips 114 and 124 of FIG. 1 may include at least one of a digital signal processor (DSP), a central processing unit (CPU), a graphics processing unit (GPU), and a modulator and demodulator (modem). For example, the processors 111 and 121 or processing chips 114 and 124 of FIG. 1 may be SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or processors enhanced from these processors.

In the present specification, an uplink may imply a link for communication from a non-AP STA to an SP STA, and an uplink PPDU/packet/signal or the like may be transmitted through the uplink. In addition, in the present specification, a downlink may imply a link for communication from the AP STA to the non-AP STA, and a downlink PPDU/packet/signal or the like may be transmitted through the downlink.

Figure 2:
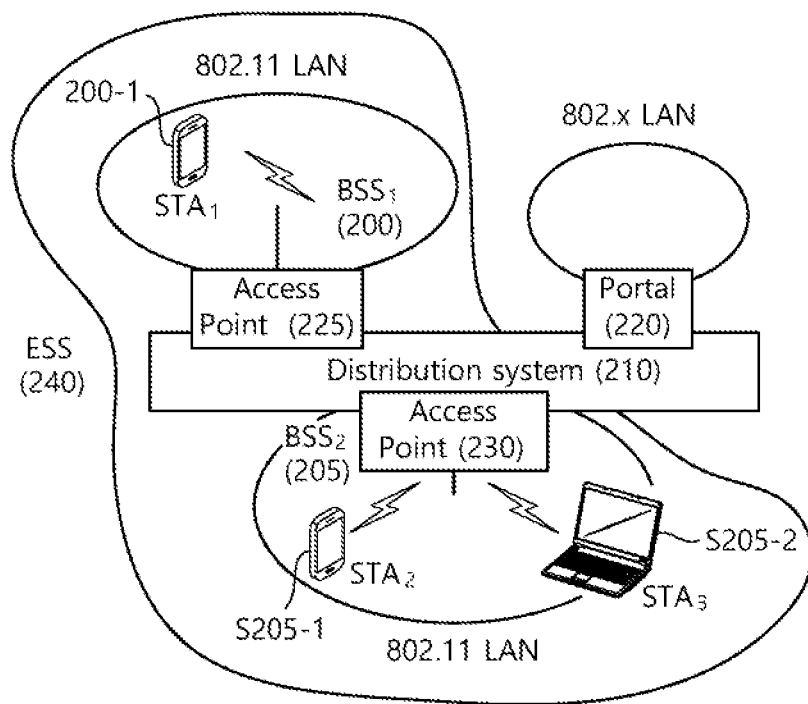
FIG. 2 is a conceptual view illustrating the structure of a wireless local area network (WLAN).
Figure 2:
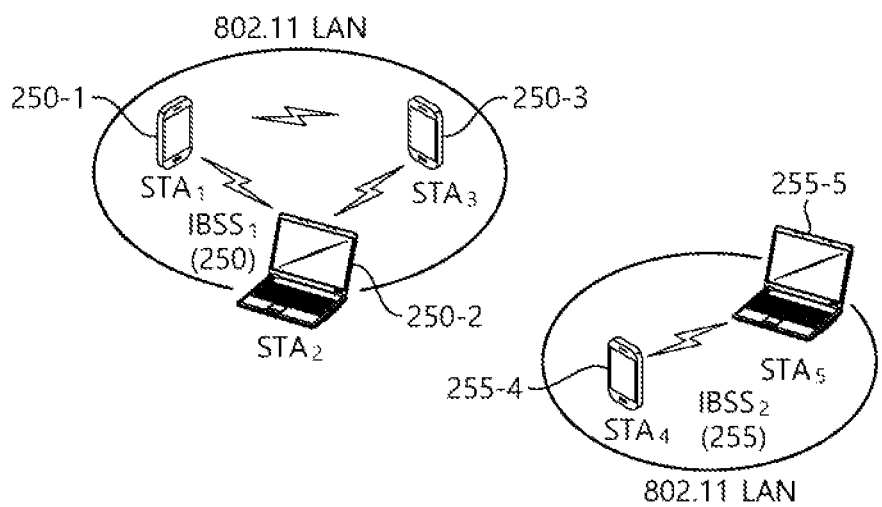

FIG. 2 is a conceptual view illustrating the structure of a wireless local area network (WLAN).

An upper part of FIG. 2 illustrates the structure of an infrastructure basic service set (BSS) of institute of electrical and electronic engineers (IEEE) 802.11.

Referring the upper part of FIG. 2, the wireless LAN system may include one or more infrastructure BSSs 200 and 205 (hereinafter, referred to as BSS). The BSSs 200 and 205 as a set of an AP and an STA such as an access point (AP) 225 and a station (STA1) 200-1 which are successfully synchronized to communicate with each other are not concepts indicating a specific region. The BSS 205 may include one or more STAs 205-1 and 205-2 which may be joined to one AP 230.

The BSS may include at least one STA, APs providing a distribution service, and a distribution system (DS) 210 connecting multiple APs.

The distribution system 210 may implement an extended service set (ESS) 240 extended by connecting the multiple BSSs 200 and 205. The ESS 240 may be used as a term indicating one network configured by connecting one or more APs 225 or 230 through the distribution system 210. The AP included in one ESS 240 may have the same service set identification (SSID).

A portal 220 may serve as a bridge which connects the wireless LAN network (IEEE 802.11) and another network (e.g., 802.X).

In the BSS illustrated in the upper part of FIG. 2, a network between the APs 225 and 230 and a network between the APs 225 and 230 and the STAs 200-1, 205-1, and 205-2 may be implemented. However, the network is configured even between the STAs without the APs 225 and 230 to perform communication. A network in which the communication is performed by configuring the network even between the STAs without the APs 225 and 230 is defined as an Ad-Hoc network or an independent basic service set (IBSS).

A lower part of FIG. 2 illustrates a conceptual view illustrating the IBSS.

Referring to the lower part of FIG. 2, the IBSS is a BSS that operates in an Ad-Hoc mode. Since the IBSS does not include the access point (AP), a centralized management entity that performs a management function at the center does not exist. That is, in the IBSS, STAs 250-1, 250-2, 250-3, 255-4, and 255-5 are managed by a distributed manner. In the IBSS, all STAs 250-1, 250-2, 250-3, 255-4, and 255-5 may be constituted by movable STAs and are not permitted to access the DS to constitute a self-contained network.

Figure 3:
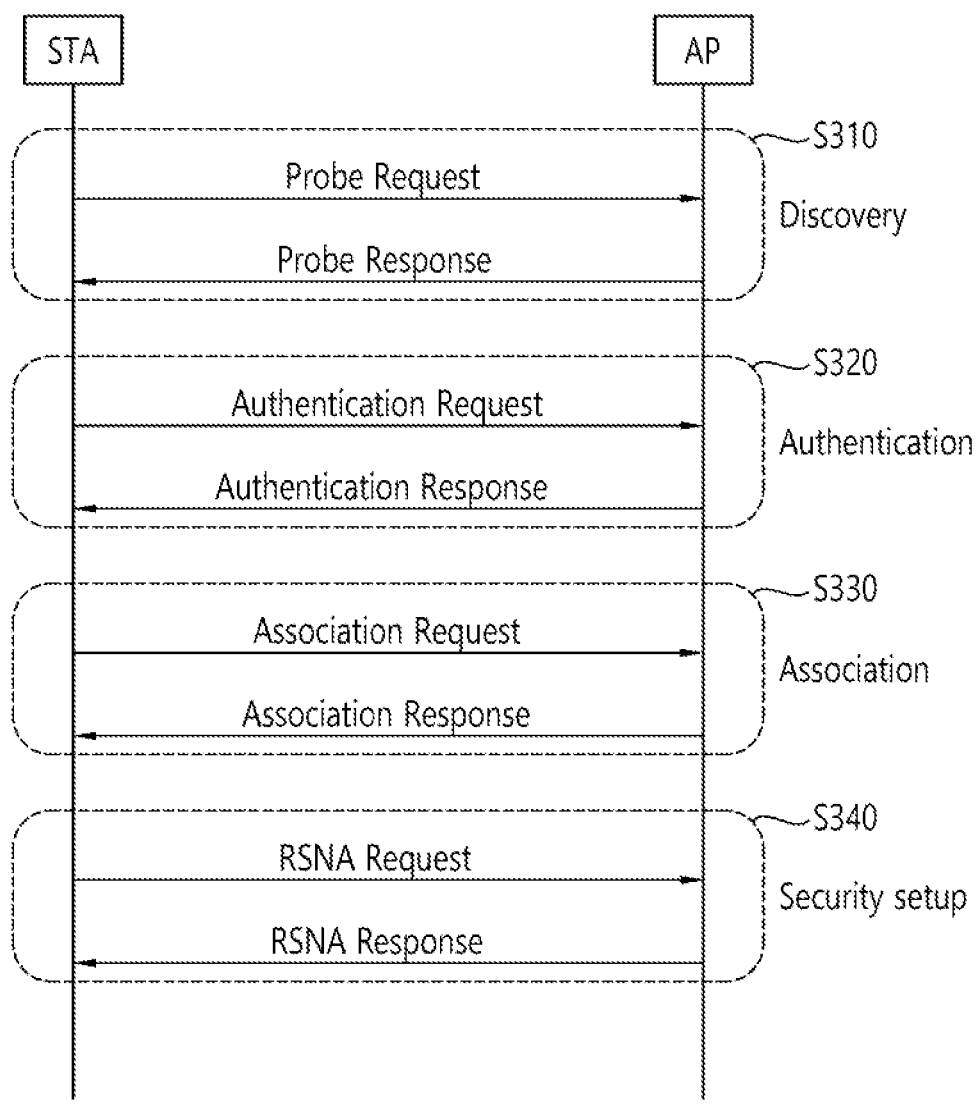
FIG. 3 illustrates a general link setup process.

FIG. 3 illustrates a general link setup process.

In S310, a STA may perform a network discovery operation. The network discovery operation may include a scanning operation of the STA. That is, to access a network, the STA needs to discover a participating network. The STA needs to identify a compatible network before participating in a wireless network, and a process of identifying a network present in a particular area is referred to as scanning. Scanning methods include active scanning and passive scanning.

FIG. 3 illustrates a network discovery operation including an active scanning process. In active scanning, a STA performing scanning transmits a probe request frame and waits for a response to the probe request frame in order to identify which AP is present around while moving to channels. A responder transmits a probe response frame as a response to the probe request frame to the STA having transmitted the probe request frame. Here, the responder may be a STA that transmits the last beacon frame in a BSS of a channel being scanned. In the BSS, since an AP transmits a beacon frame, the AP is the responder. In an IBSS, since STAs in the IBSS transmit a beacon frame in turns, the responder is not fixed. For example, when the STA transmits a probe request frame via channel 1 and receives a probe response frame via channel 1, the STA may store BSS-related information included in the received probe response frame, may move to the next channel (e.g., channel 2), and may perform scanning (e.g., transmits a probe request and receives a probe response via channel 2) by the same method.

Although not shown in FIG. 3, scanning may be performed by a passive scanning method. In passive scanning, a STA performing scanning may wait for a beacon frame while moving to channels. A beacon frame is one of management frames in IEEE 802.11 and is periodically transmitted to indicate the presence of a wireless network and to enable the STA performing scanning to find the wireless network and to participate in the wireless network. In a BSS, an AP serves to periodically transmit a beacon frame. In an IBSS, STAs in the IBSS transmit a beacon frame in turns. Upon receiving the beacon frame, the STA performing scanning stores information about a BSS included in the beacon frame and records beacon frame information in each channel while moving to another channel. The STA having received the beacon frame may store BSS-related information included in the received beacon frame, may move to the next channel, and may perform scanning in the next channel by the same method.

After discovering the network, the STA may perform an authentication process in S320. The authentication process may be referred to as a first authentication process to be clearly distinguished from the following security setup operation in S340. The authentication process in S320 may include a process in which the STA transmits an authentication request frame to the AP and the AP transmits an authentication response frame to the STA in response. The authentication frames used for an authentication request/response are management frames.

The authentication frames may include information about an authentication algorithm number, an authentication transaction sequence number, a status code, a challenge text, a robust security network (RSN), and a finite cyclic group.

The STA may transmit the authentication request frame to the AP. The AP may determine whether to allow the authentication of the STA based on the information included in the received authentication request frame. The AP may provide the authentication processing result to the STA via the authentication response frame.

When the STA is successfully authenticated, the STA may perform an association process in S330. The association process includes a process in which the STA transmits an association request frame to the AP and the AP transmits an association response frame to the STA in response. The association request frame may include, for example, information about various capabilities, a beacon listen interval, a service set identifier (SSID), a supported rate, a supported channel, RSN, a mobility domain, a supported operating class, a traffic indication map (TIM) broadcast request, and an interworking service capability. The association response frame may include, for example, information about various capabilities, a status code, an association ID (AID), a supported rate, an enhanced distributed channel access (EDCA) parameter set, a received channel power indicator (RCPI), a received signal-to-noise indicator (RSNI), a mobility domain, a timeout interval (association comeback time), an overlapping BSS scanning parameter, a TIM broadcast response, and a QoS map.

In S340, the STA may perform a security setup process. The security setup process in S340 may include a process of setting up a private key through four-way handshaking, for example, through an extensible authentication protocol over LAN (EAPOL) frame.

Hereinafter, a PPDU transmitted/received in a STA of the present specification will be described.

Figure 4:
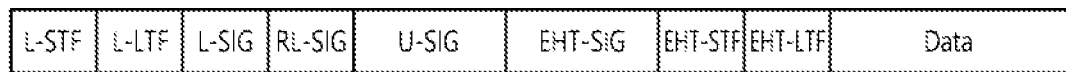
FIG. 4 illustrates an example of a PPDU used in the present specification.

FIG. 4 illustrates an example of a PPDU used in the present specification.

The PPDU of FIG. 4 may be called in various terms such as an EHT PPDU, a TX PPDU, an RX PPDU, a first type or N-th type PPDU, or the like. For example, in the present specification, the PPDU or the EHT PPDU may be called in various terms such as a TX PPDU, a RX PPDU, a first type or N-th type PPDU, or the like. In addition, the EHT PPDU may be used in an EHT system and/or a new WLAN system enhanced from the EHT system.

The PPDU of FIG. 4 may indicate the entirety or part of a PPDU type used in the EHT system. For example, the example of FIG. 4 may be used for both of a single-user (SU) mode and a multi-user (MU) mode. In other words, the PPDU of FIG. 4 may be a PPDU for one receiving STA or a plurality of receiving STAs. When the PPDU of FIG. 4 is used for a trigger-based (TB) mode, the EHT-SIG of FIG. 4 may be omitted. In other words, a STA which has received a trigger frame for uplink-MU (UL-MU) may transmit the PPDU in which the EHT-SIG is omitted in the example of FIG. 4.

In FIG. 4, an L-STF to an EHT-LTF may be called a preamble or a physical preamble, and may be generated/transmitted/received/obtained/decoded in a physical layer.

A subcarrier spacing of the L-STF, L-LTF, L-SIG, RL-SIG, U-SIG, and EHT-SIG fields of FIG. 4 may be determined as 312.5 kHz, and a subcarrier spacing of the EHT-STF, EHT-LTF, and Data fields may be determined as 78.125 kHz. That is, a tone index (or subcarrier index) of the L-STF, L-LTF, L-SIG, RL-SIG, U-SIG, and EHT-SIG fields may be expressed in unit of 312.5 kHz, and a tone index (or subcarrier index) of the EHT-STF, EHT-LTF, and Data fields may be expressed in unit of 78.125 kHz.

In the PPDU of FIG. 4, the L-LTF and the L-STF may be the same as those in the conventional fields.

The transmitting STA may generate an RL-SIG generated in the same manner as the L-SIG. BPSK modulation may be applied to the RL-SIG. The receiving STA may know that the RX PPDU is the HE PPDU or the EHT PPDU, based on the presence of the RL-SIG.

A universal SIG (U-SIG) may be inserted after the RL-SIG of FIG. 4. The U-SIG may be called in various terms such as a first SIG field, a first SIG, a first type SIG, a control signal, a control signal field, a first (type) control signal, or the like.

The U-SIG may include information of N bits, and may include information for identifying a type of the EHT PPDU. For example, the U-SIG may be configured based on two symbols (e.g., two contiguous OFDM symbols). Each symbol (e.g., OFDM symbol) for the U-SIG may have a duration of 4 us. Each symbol of the U-SIG may be used to transmit the 26-bit information. For example, each symbol of the U-SIG may be transmitted/received based on 52 data tomes and 4 pilot tones.

The common field of the EHT-SIG and the user-specific field of the EHT-SIG may be individually coded. One user block field included in the user-specific field may include information for two users, but a last user block field included in the user-specific field may include information for one user. That is, one user block field of the EHT-SIG may include up to two user fields. As in the example of FIG. 6, each user field may be related to MU-MIMO allocation, or may be related to non-MU-MIMO allocation.

The common field of the EHT-SIG may include a CRC bit and a tail bit. A length of the CRC bit may be determined as 4 bits. A length of the tail bit may be determined as 6 bits, and may be set to '000000'.

The common field of the EHT-SIG may include RU allocation information. The RU allocation information may imply information related to a location of an RU to which a plurality of users (i.e., a plurality of receiving STAs) are allocated. The RU allocation information may be configured in unit of 8 bits (or N bits), as in Table 1.

In the following example, a signal represented as a (TX/RX/UL/DL) signal, a (TX/RX/UL/DL) frame, a (TX/RX/UL/DL) packet, a (TX/RX/UL/DL) data unit, (TX/RX/UL/DL) data, or the like may be a signal transmitted/received based on the PPDU of FIG. 4. The PPDU of FIG. 4 may be used to transmit/receive frames of various types. For example, the PPDU of FIG. 4 may be used for a control frame. An example of the control frame may include a request to send (RTS), a clear to send (CTS), a power save-poll (PS-poll), BlockACKReq, BlockAck, a null data packet (NDP) announcement, and a trigger frame. For example, the PPDU of FIG. 4 may be used for a management frame. An example of the management frame may include a beacon frame, a (re-)association request frame, a (re-)association response frame, a probe request frame, and a probe response frame. For example, the PPDU of FIG. 4 may be used for a data frame. For example, the PPDU of FIG. 4 may be used to simultaneously transmit at least two or more of the control frame, the management frame, and the data frame.

Figure 5:
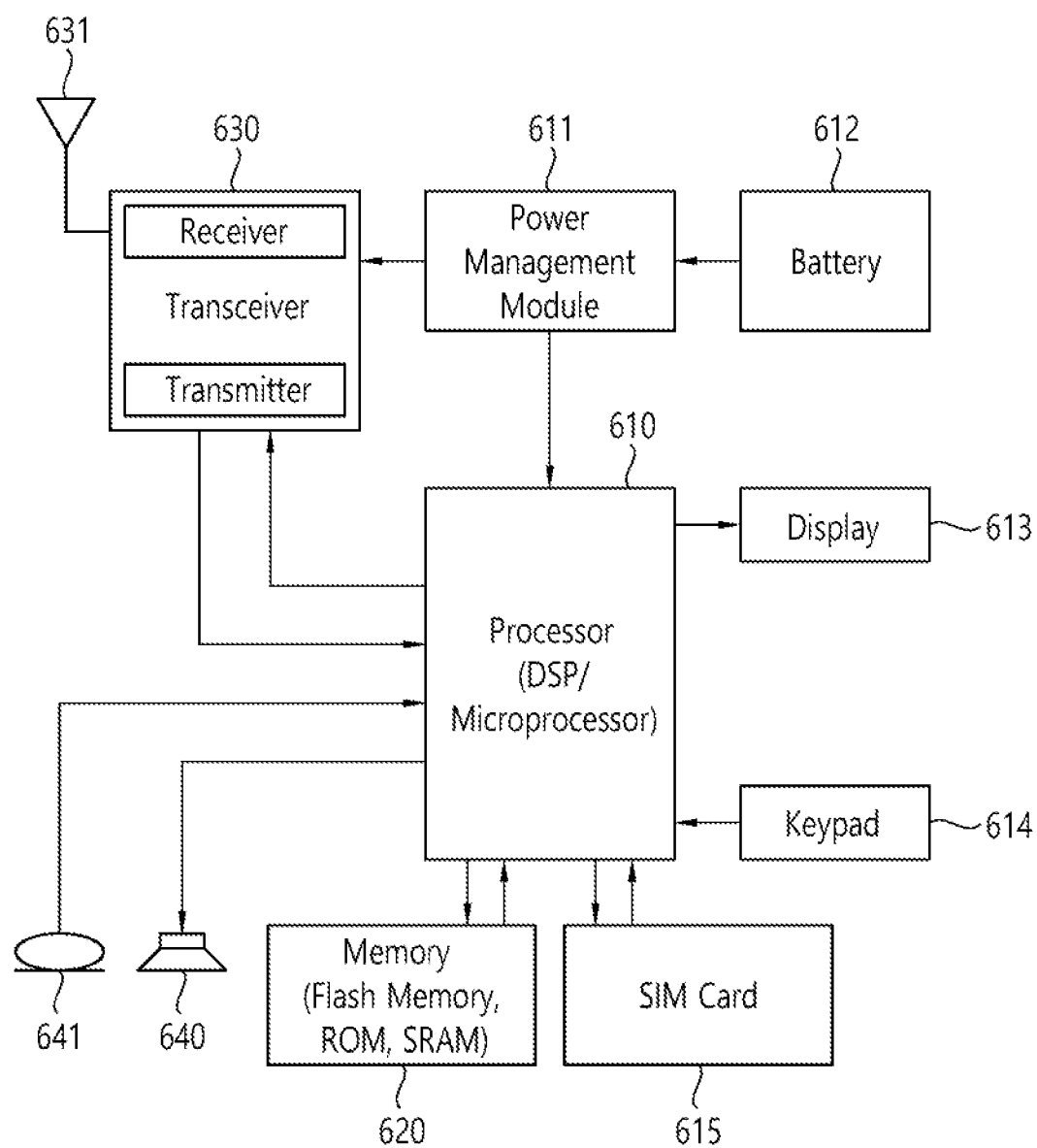
FIG. 5 illustrates an example of a modified transmission device and/or receiving device of the present specification.

FIG. 5 illustrates an example of a modified transmission device and/or receiving device of the present specification.

Each device/STA of the sub-figure (a)/(b) of FIG. 1 may be modified as shown in FIG. 5. A transceiver 630 of FIG. 5 may be identical to the transceivers 113 and 123 of FIG. 1. The transceiver 630 of FIG. 5 may include a receiver and a transmitter.

A processor 610 of FIG. 5 may be identical to the processors 111 and 121 of FIG. 1. Alternatively, the processor 610 of FIG. 5 may be identical to the processing chips 114 and 124 of FIG. 1.

A memory 620 of FIG. 5 may be identical to the memories 112 and 122 of FIG. 1. Alternatively, the memory 620 of FIG. 5 may be a separate external memory different from the memories 112 and 122 of FIG. 1.

Referring to FIG. 5, a power management module 611 manages power for the processor 610 and/or the transceiver 630. A battery 612 supplies power to the power management module 611. A display 613 outputs a result processed by the processor 610. A keypad 614 receives inputs to be used by the processor 610. The keypad 614 may be displayed on the display 613. A SIM card 615 may be an integrated circuit which is used to securely store an international mobile subscriber identity (IMSI) and its related key, which are used to identify and authenticate subscribers on mobile telephony devices such as mobile phones and computers.

Referring to FIG. 5, a speaker 640 may output a result related to a sound processed by the processor 610. A microphone 641 may receive an input related to a sound to be used by the processor 610.

Figure 6:
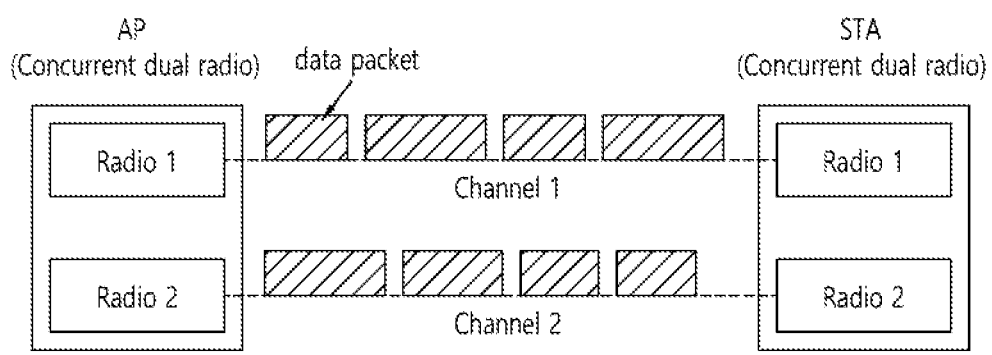
FIG. 6 is a diagram illustrating an embodiment of multi-link operation of a dual radio STA.
Figure 6:
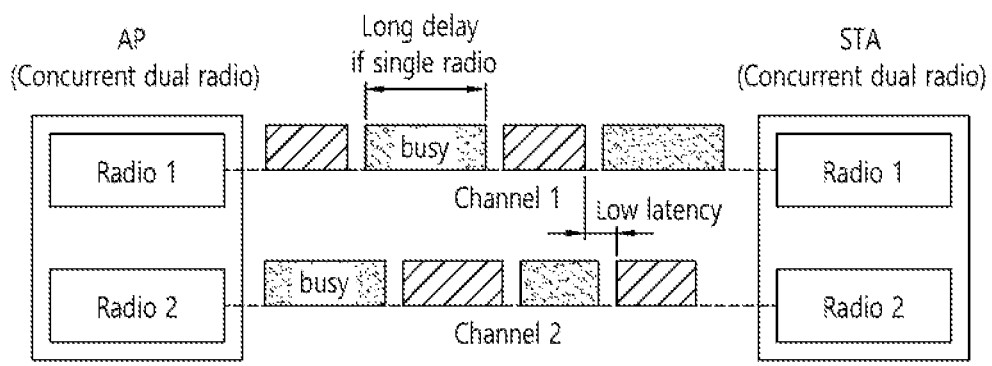
Figure 7:
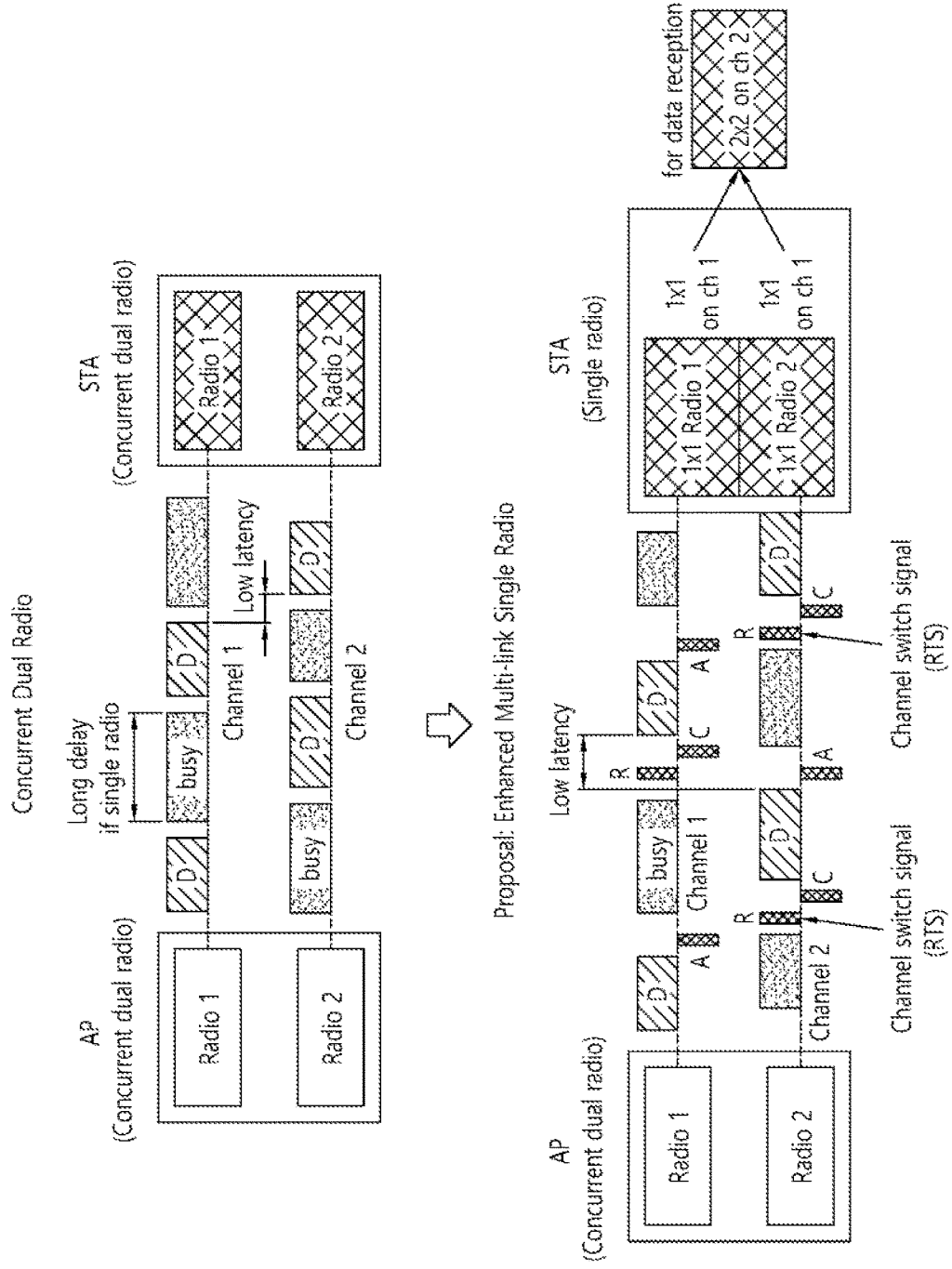
FIG. 7 illustrates an embodiment of multi-link operation of a single radio STA (i.e., MLSR STA).

FIG. 6 is a diagram illustrating an embodiment of multi-link operation of a dual radio STA, and FIG. 7 illustrates an embodiment of multi-link operation of a single radio STA (i.e., MLSR STA).

Referring to FIG. 6, the upper sub-figure is an ideal case, which may be a case where there is no overlapping network and channel 1 and channel 2 are idle. The maximum throughput gain of a concurrent dual radio can be obtained when both channels are idle.

Referring to FIG. 6, the lower sub-figure is a reality case, and channels 1 and 2 may be busy due to overlapping networks. As the network gets busier, the chances of having two (or several) idle channels at the same time may decrease. In this case, in most cases, only one of the two channels can be used for data transmission. This is effectively single-channel operation, but a switch can occur between the two channels. In busy networks, concurrent dual radio can provide a low latency advantage over a single radio because the AP can transmit packets on all channels when the medium is idle.

In a congested network environment, concurrent dual radio may not provide the full benefit of simultaneous transmit and receive (STR).

Referring to FIG. 7, the upper sub-figure may represent concurrent dual radio and the lower sub-figure may represent enhanced multi-link single radio (MLSR). The enhanced multi-link single radio (MLSR) non-AP MLD can hear through two (or several) preset channels at the same time. That is, monitoring for reception may be performed by the MLSR non-AP MLD. A 2×2 Tx/Rx module can be configured as a 1×1 on each channel/band (e.g. 5 GHz, 6 GHz) to monitor incoming packets on each channel. A 1×x1 STA of one channel may be added to a 1×1 Rx of another channel, and may monitor (i.e., listen) to packets coming from both channels. The AP MLD may transmit a control frame (e.g., RTS or MU-RTS) before data frame transmission on a preconfigured IDLE channel. The control frame (transmitted to the non-AP MLD) may include information on which channel is used for data transmission. Upon receiving the control frame, the non-AP MLD may respond with a control frame (e.g., CTS). The AP MLD may transmit data after receiving the response control frame. A non-AP MLD and an AP MLD can only exchange frames on one link at a time.

The enhanced multi-link single radio (MLSR) MLD can support multi-link, but cannot operate on more than two links at the same time. That is, the enhanced MLSR MLD can transmit/receive only on one link at the same time. However, the enhanced MLSR MLD can perform transmission/reception on a specific link while performing transmission/reception on another link. For example, the enhanced MLSR MLD monitors signal reception in two links of the first and second links, and when a signal is received in the first link, the receiver (e.g., antenna) used in the second link can be used for signal reception in the first link.

The enhanced MLSR MLD can have a shorter reception delay than an existing single radio STA and can use multi-link efficiently. It is preferable for the AP to select an appropriate channel while remaining in an idle state among multi-links. For example, when both links are idle, if the AP selects one link, and transmits RTS/MU-RTS and receives CTS as a response (through the selected link), multiple streams (e.g., 2×2) may be sent through the corresponding link for data transmission. In this case, although a specific link may be better for the terminal, if the AP does not have the corresponding information, the AP randomly selects and transmits the link, which may degrade link performance.

Also, even in an uplink situation, when a non-AP MLD receives a trigger frame, if the received link state is busy, an uplink frame (e.g., TB PPDU) cannot be transmitted.

In this specification, a method to solve this problem is proposed.

In the present specification, when an MLD/STA with a single radio capability transmits an uplink frame, it may transmit its preferred (or recommended) link information, and/or channel state information (e.g., CQI (channel quality indication), and/or preferred modulation and coding scheme (MCS) information).

Preferred (or, Recommended) Link Information

Option 1-1: The preferred link information may include information related to which link is a preferred link or preferred links. For example, preferred link information may include link ID or link bitmap. The link information may indicate one or more links. It can be indicated based on the Link bitmap. For example, Bit #0 may be related to the link 1, Bit #1 may be related to the link 2, . . . , Bit #n may be related to the link #N.

Option 1-2: The preferred link information may include information related to whether or not the current link is a preferred link. For example, the value of the preferred link field may be zero (0) if the current link is a preferred link, and the value of the preferred link field may be one (1) if the current link is not a preferred link. If the value of the preferred link field is set to zero (0), the AP may consider link(s) other than the current link as the preferred link(s) of the terminal.

The preferred (or recommended) link information may be entered into different fields for DL (downlink) and UL (uplink). For example, a DL Preferred (or Recommended) link and a UL Preferred (or Recommended) link may be transmitted separately.

DL Preferred link: The enhanced single radio MLD indicates a link on which a DL frame is preferred or recommended. Based on this information, the AP can select a link used for DL frame transmission to the UE.

UL Preferred (or Recommended) link: Indicates a preferred or recommended link when an enhanced single radio MLD transmits a UL frame. Based on this information, the AP can select a link for trigger frame transmission to allocate UL resources to the UE.

Each distinct field may be separately defined and transmitted, and for a preferred (or recommended) link, a DL/UL flag may be used to indicate whether a corresponding link is related to DL or UL. That is, preferred link information for uplink and preferred link information for downlink may be separately defined, or preferred link information and fields related to UL/DL may be separately defined.

If preferred (or recommended) link information is not included, the current link continues to be a preferred link. That is, if the enhanced single radio MLD does not transmit the preferred link information to the AP MLD, the operating link may not change.

The AP (or AP MLD) may transmit a frame requesting the non-AP STA (or MLD) to transmit preferred (or recommended) link information, and upon receiving the request frame, a non-AP STA (or an MLD) may transmit a response frame including preferred link information to an AP (or an AP MLD).

The preferred link may be included in A Control fields such as HT Control field, VHT Control field, and HE Control field and/or QoS Control field. Alternatively, the preferred link information may be included in a management frame or action frame in the form of an element and transmitted. Alternatively, the preferred link information may be included in a subfield in an existing or newly defined control frame such as an Ack frame, Block Ack frame, or CTS frame.

Preferred Link Information Indication

A UE (e.g., enhanced multi-link single radio MLD) may transmit an uplink frame including preferred link information for receiving its own DL data.

Figure 8:
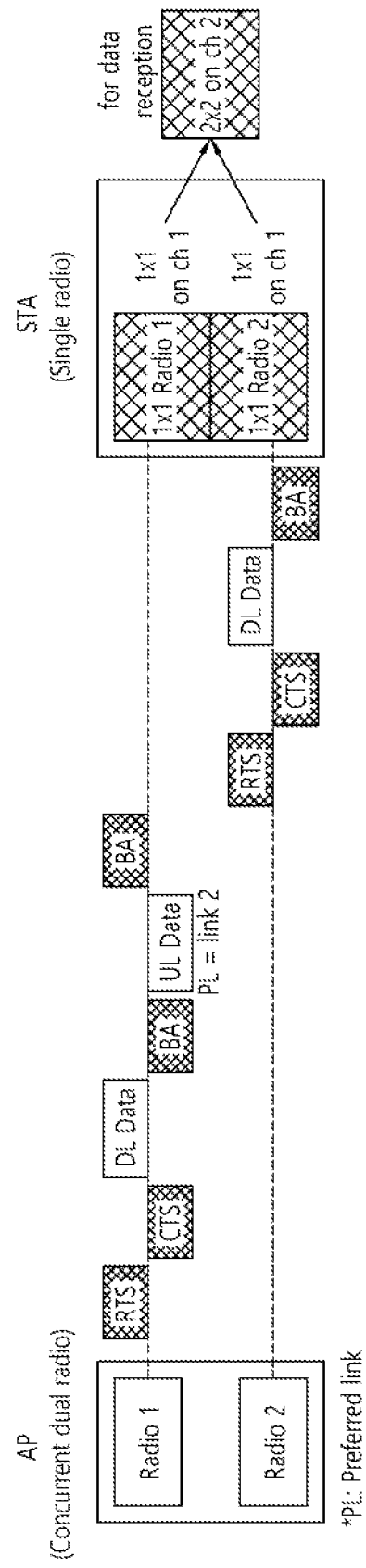
FIG. 8 is a diagram illustrating an embodiment of a preferred link (PL) information transmission method.

FIG. 8 is a diagram illustrating an embodiment of a preferred link (PL) information transmission method.

Referring to FIG. 8, an AP may initially perform DL data frame transmission through the link 1. The eMLSR MLD may transmit UL data including preferred link information (e.g., link 2) to the AP. Thereafter, the AP may transmit a DL data frame through the link 2. The UL data frame may include a QoS Data frame, a QoS Null frame, and the like.

For example, the eMLSR MLD may include a first receiver (e.g., 1×1 on CH1) and a second receiver (e.g., 1×1 on CH2). In the eMLSR MLD, RTS and CTS frames can be received using only the first receiver, and DL DATA can be received using both the first receiver and the second receiver. That is, the eMLSR MLD can use both the first receiver and the second receiver (i.e., 2×2 on CH2) when receiving DL DATA in the second link, and when receiving RTS in the second link, the second receiver (i.e., 1×1 on CH2) can be used.

Figure 9:
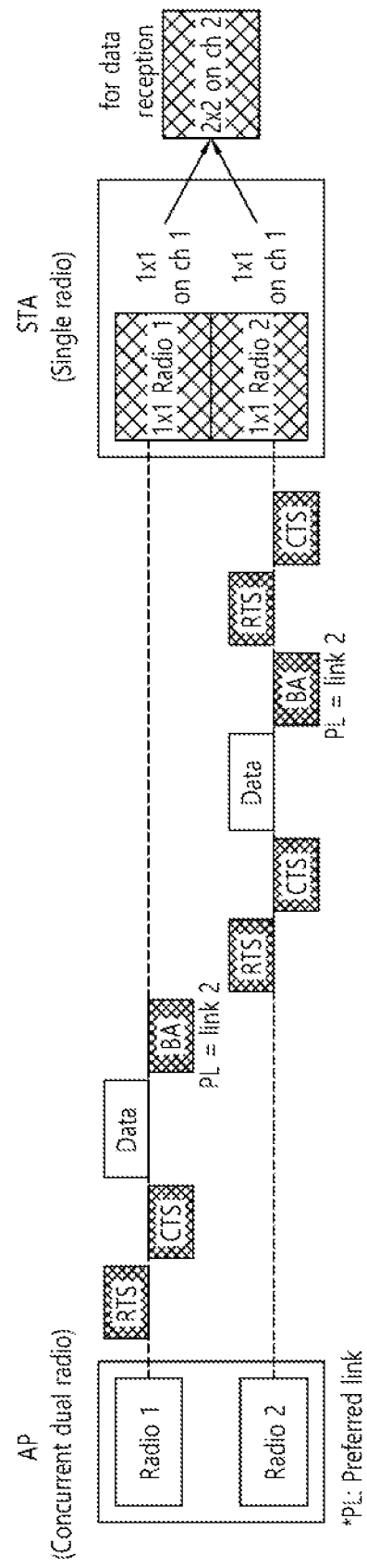
FIG. 9 is a diagram illustrating an embodiment of a preferred link information transmission method.

FIG. 9 is a diagram illustrating an embodiment of a preferred link information transmission method.

Referring to FIG. 9, the enhanced multi-link single radio MLD may transmit preferred link information through a Block Ack frame, which is one of Control frames. The AP may transmit RTS through the link 1, receive CTS, and then transmit data. A single radio STA/MLD may transmit Block Ack in response to data reception. At this time, Preferred link (PL) information in the block ack may be related to the link 2. The AP MLD may attempt data transmission using the link 2 during next DL transmission by using the preferred link information related to the link 2. In case the RTS is transmitted through the link 2, the CTS is transmitted as a response, and the Data is transmitted to a non-AP STA through the link 2, when the non-AP STA (i.e., eMLSR non-AP STA/MLD) transmits the BA, the preferred link may be set to the link 2 and transmitted.

For example, the eMLSR MLD may include a first receiver (e.g., 1×1 on Ch1) and a second receiver (e.g., 1×1 on CH2). In the eMLSR MLD, RTS and CTS frames can be received using only the first receiver, and DL DATA can be received using both the first receiver and the second receiver. That is, the eMLSR MLD can use both the first receiver and the second receiver (i.e., 2×2 on CH2) when receiving the DL DATA in the second link, and when receiving RTS in the second link, the second receiver (i.e., 1×1 on CH2) can be used.

For example, the preferred link information may be included in an Ack frame, a Multi-STA Block frame, or a Multi-TID Block frame in addition to the Block Ack frame. The preferred link information may be included in other control frames, for example, the new CTS frame. Alternatively, the preferred link information may be included in the form of an element in a management frame or action frame.

In the Multi-STA BlockAck variant, BA Information can be configured as follows.

Figure 10:
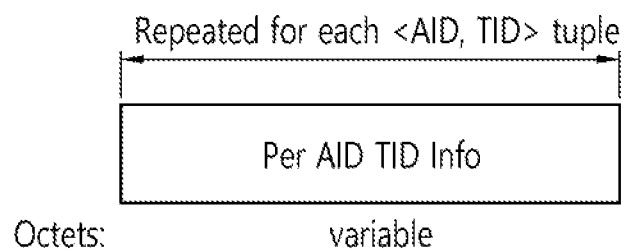
Figure 12:
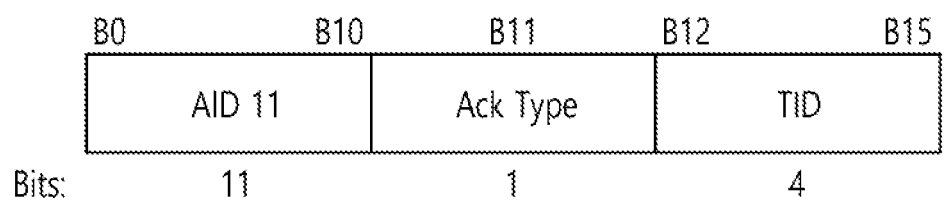

FIG. 10 to FIG. 12 show an embodiment of a method in which the preferred link information is included in Multi-STA Block Ack.

FIG. 10 is a diagram showing an embodiment of a BA information field, FIG. 11 is a diagram showing an embodiment of a Per AID TID Info field when the value of the AID11 field is not '2045', and FIG. 12 is a diagram showing an embodiment related to the AID TID Info field.

Referring to FIG. 10, the Multi-STA Block Ack frame may include a BA information field. The BA information field may include a Per AID TID Info field.

Referring to FIG. 11, the Per AID TID Info field may include AID TID info, Block Ack Starting Sequence Control, and Block ack Bitmap fields when the value of the AID11 field is not '2045'.

Referring to FIG. 12, the AID TID info field may include the AID11, Ack Type, and TID fields.

Method 2-1: When the value of the AID11 field is set to a specific value (e.g., 2044), the Preferred link bitmap subfield is included instead of the Ack Type field and the TID field. FIG. 13 shows an example of the above.

FIG. 13 is a diagram illustrating an embodiment of an AID TID Info field.

Referring to FIG. 13, when the AID11 is set to '2044', a preferred link bitmap may be included. For example, if the value of the AID11 field is '2044', the AID TID info field may include the AID11, Preferred link bitmap, and Reserved fields. In this case, the Block Ack Starting Sequence Control subfield and Block Ack Bitmap may not be included in the Per AID TID Info field.

Figure 14:
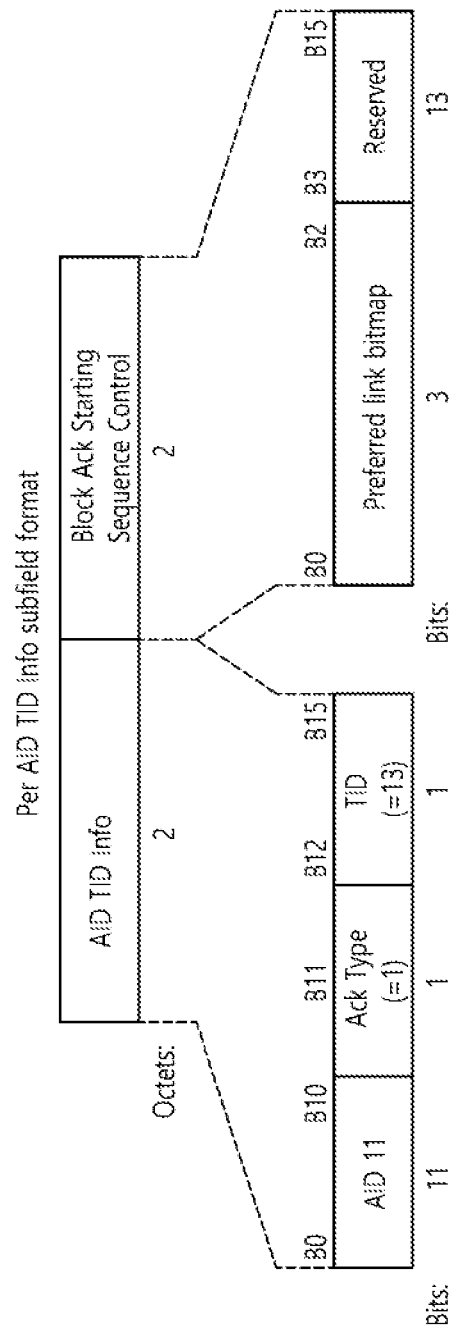
FIG. 14 is a diagram illustrating an embodiment of a Per AID TID field.

Method 2-2: The AID11 indicates the AID of the terminal, and when the values of the Ack Type subfield and the TID subfield have specific values (e.g., Ack Type=1, TID=13),) preferred link information may be included in a later part (e.g., Block Ack Starting Sequence Control field. Therefore, in this case, the Per AID TID Info field may include only the Block Ack Starting Sequence Control subfield and may not include the Block Ack Bitmap. FIG. 14 shows an example of the above.

FIG. 14 is a diagram illustrating an embodiment of a Per AID TID field.

Referring to FIG. 14, Ack Type may be set to '1' and TID may be set to '13', and a Preferred link bitmap may be included behind. The Ack Type and TID can be set in combination using different values.

For example, in order to indicate whether the current link is a preferred link or not, only the AID TID Info field may be included in the Per AID TID Info subfield. For example, when Ack Type=1 TID=13, it may mean that the current link is not the preferred link. For example, Ack Type=1 TID=12 may mean that the current link is the preferred link.

The preferred link information may be included in the HE A control field and transmitted. The preferred link information may be included in an existing HE A Control field (e.g., HLA Control field, etc.) or a new A Control field (e.g., Recommended link Control field). The preferred link information may be information related to which link is the preferred link in the form of the above-mentioned preferred link bitmap or information related to whether a link other than the current link is the preferred link in the form of 1-bit.

Instead of notifying the AP MLD (or AP) of the preferred link (or recommended link) for non-AP MLD/STA to operate, channel state information (e.g., CQI, Link adaptation information (For example, Recommended MCS, Recommended dual carrier modulation (DCM), Recommended resource unit information, Recommended bandwidth, and/or Recommended number of spatial stream), and/or Bandwidth Query Report (BQR: e.g., information indicating which 20 MHz channel is idle or busy) information) may be transmitted to the AP MLD (or AP).

When an AP (or AP MLD) receives channel information for each link from a terminal (non-AP MLD), based on the information, the AP can select an efficient link among links idled by the primary channel and inform the terminal of the selected link.

Figure 15:
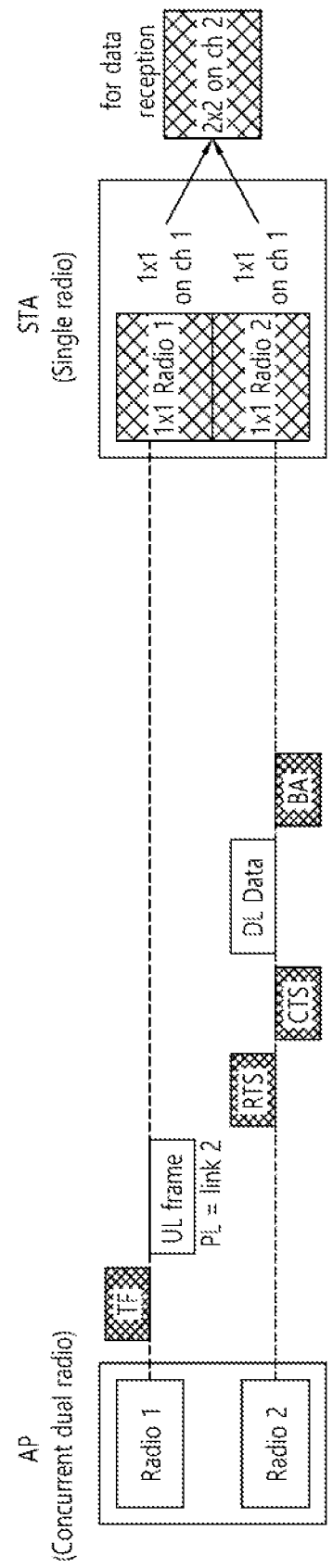
FIG. 15 is a diagram illustrating an embodiment of a method for an AP to request preferred link information from an MLSR STA.

As mentioned above, A terminal (non-AP STA or non-AP MLD) unsolicitedly transmits the preferred link (or recommended link) or the channel state information (e.g., CQI feedback, Link adaptation information, and/or BQR information, etc.) for each link to the AP (or AP MLD), but the AP may request to transmit the corresponding information. FIG. 15 shows an example of the above.

FIG. 15 is a diagram illustrating an embodiment of a method for an AP to request preferred link information from an MLSR STA.

Referring to FIG. 15, the AP may request preferred link information from the UE using a trigger frame (TF) in the link 1. Upon receiving the trigger frame requesting preferred link information through the link 1, the UE may transmit a UL frame including the preferred link information through the link 1. The terminal can set the link 2 as the preferred link. If both links (i.e., link 1 and link 2) are idle, the AP may transmit RTS via the link 2, which is the preferred link of the UE, and then transmit DL data.

Figure 16:
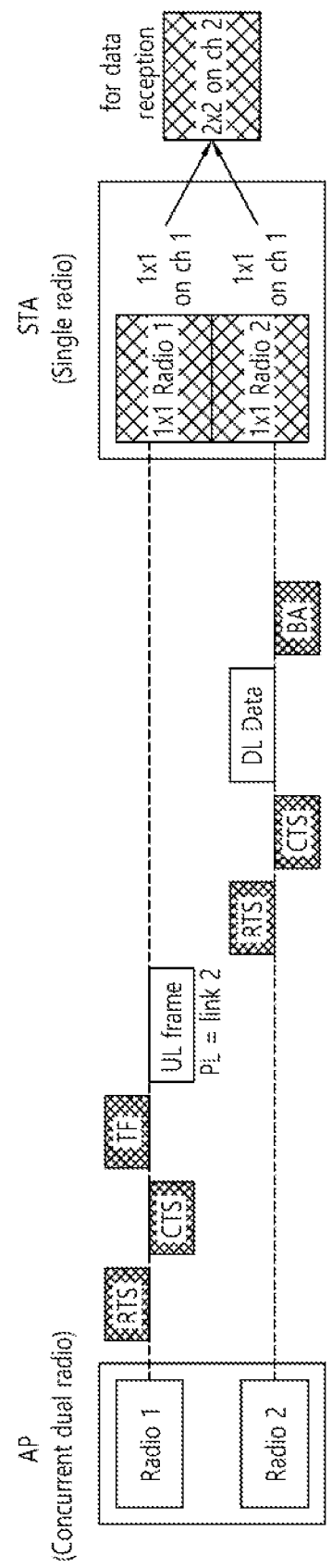
FIG. 16 is a diagram illustrating an embodiment of a method for an AP to request preferred link information from an MLSR STA.

Preferred link (or channel state information of each link) can be obtained using the methods mentioned above (e.g., the QoS data frame, or QoS Null frame including A Control field including the corresponding information, or Multi-STA Block Ack frame or Block Ack Frame, Ack Frame, or other control frame, other action frame, other management frame). FIG. 16 shows another example of the above.

FIG. 16 is a diagram illustrating an embodiment of a method for an AP to request preferred link information from an MLSR STA.

Referring to FIG. 16, an AP may exchange the RTS and the CTS with a UE before transmitting a trigger frame for triggering channel state information of a preferred link/each link. Thereafter, the AP may transmit a trigger frame through a corresponding link (e.g., the link 1), and obtain preferred link and/or channel state information of each link from the terminal. The remaining of the operation may be the same as that of FIG. 15.

Figure 17:
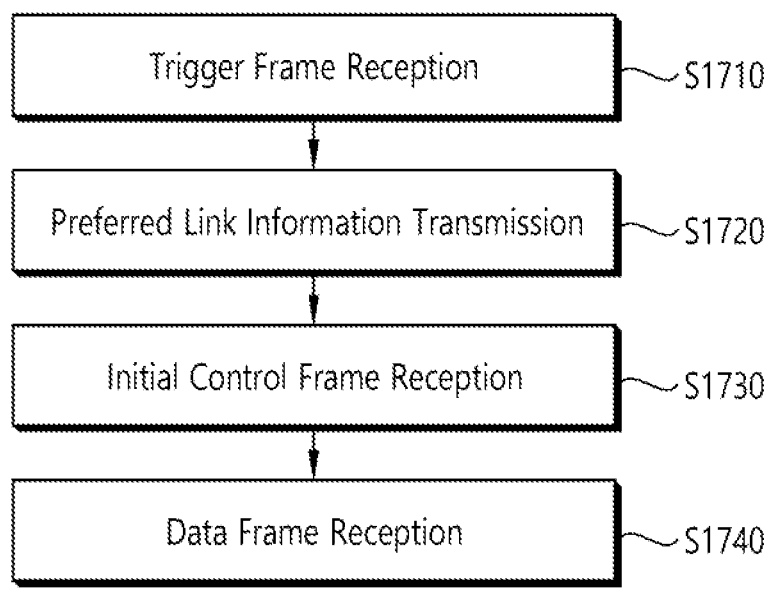
FIG. 17 is a diagram illustrating an embodiment of a method of operating an MLSR STA.

FIG. 17 is a diagram illustrating an embodiment of a method of operating an MLSR STA.

The method of FIG. 17 may be based on the above FIGS. 6 to 16.

Referring to FIG. 17, an MLSR STA is an STA incapable of simultaneous transmission and reception in different links, and the MLSR STA may include a first receiver and a second receiver.

The MLSR STA may receive a trigger frame (S1710). For example, the MLSR STA may receive a trigger frame requesting preferred link information from the AP MLD.

The MLSR STA may transmit preferred link information (S1720). For example, the MLSR STA may transmit preferred link information related to the second link to an access point (AP) multi-link device (MLD) in the first link.

For example, the preferred link information may include preferred link information for downlink and preferred link information for uplink.

For example, the preferred link information may be included in a trigger based physical protocol data unit (PPDU).

For example, the preferred link information may be included in a block acknowledgment (BA) frame.

The MLSR STA may receive an initial control frame (S1730). For example, the MLSR STA may receive an initial control frame from the AP MLD through the first receiver in the second link.

For example, when the first receiver receives the initial control frame in the second link, the second receiver may perform monitoring for signal reception in the first link.

The MLSR STA may receive a data frame (S1740). For example, the MLSR STA may receive a data frame from the AP MLD through the first and second receivers in the second link.

Figure 18:
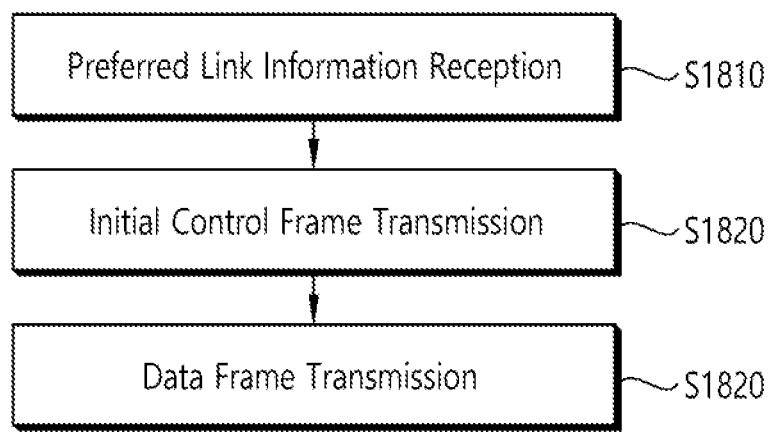
FIG. 18 is a diagram illustrating an embodiment of an AP MLD operating method.

FIG. 18 is a diagram illustrating an embodiment of an AP MLD operating method.

The method of FIG. 18 may be based on the above FIGS. 6 to 16.

Referring to FIG. 18, the AP MLD may receive preferred link information (S1810). For example, the AP MLD may receive preferred link information related to the second link from a multi-link single radio (MLSR) station (STA) in the first link.

The AP MLD may transmit an initial control frame (S1820). For example, the AP MLD may transmit an initial control frame to the MLSR STA in the second link.

The AP MLD may transmit a data frame (S1830). For example, the AP MLD may transmit a data frame to the MLSR STA in the second link.

Some of the detailed steps shown in the examples of FIGS. 17 and 18 may not be essential steps and may be omitted. In addition to the steps shown in FIGS. 17 and 18, other steps may be added, and the order of the steps may be changed. Some of the above steps may have separate technical features.

The technical features of the present specification described above may be applied to various devices and methods. For example, the technical features of the present specification described above may be performed/supported through the device of FIGS. 1 and/or 5. For example, the technical features of the present specification described above are implemented based on the processing chips 114 and 124 of FIG. 1, implemented based on the processors 111 and 121 and the memories 112 and 122 of FIG. 1, or implemented based on the processor 610 and the memory 620 of FIG. 5. For example, an apparatus of the present specification may comprise a memory; and a processor operatively coupled to the memory, wherein the processor is adapted to: transmit preferred link information related to the second link to an access point (AP) multi-link device (MLD) in a first link; receive an initial control frame from the AP through the first receiver in the second link; and receive a data frame from the AP through the first and second receivers in the second link.

Technical features of the present specification may be implemented based on a computer readable medium (CRM). For example, the CRM proposed by the present specification is based on being executed by at least one processor of a multi-link single radio (MLSR) STA (station) of a Wireless Local Area Network (WLAN) system. The CRM stores instructions that perform operations comprising: wherein the MLSR STA is not able to transmit and receive simultaneously in different links, and the MLSR STA includes a first receiver and a second receiver, transmitting preferred link information related to the second link to an access point (AP) multi-link device (MLD) in a first link; receiving an initial control frame from the AP MLD through the first receiver in the second link; and receiving a data frame from the AP MLD through the first and second receivers in the second link.

Instructions stored in the CRM of the present specification may be executed by at least one processor. At least one processor related to the CRM of the present specification may be the processors 111 and 121 or the processing chips 114 and 124 of FIG. 1 or the processor 610 of FIG. 5. Meanwhile, the CRM of this specification may be the memories 112 and 122 of FIG. 1, the memory 620 of FIG. 5, or a separate external memory/storage medium/disk.

The foregoing technical features of this specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyper-parameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

The claims set forth herein may be combined in a variety of ways. For example, the technical features of the method claims of the present specification may be combined to be implemented as a device, and the technical features of the device claims of the present specification may be combined to be implemented by a method. In addition, the technical characteristics of the method claim of the present specification and the technical characteristics of the device claim may be combined to be implemented as a device, and the technical characteristics of the method claim of the present specification and the technical characteristics of the device claim may be combined to be implemented by a method.

What is claimed is:

1. A method in a wireless local area network (WLAN) system, the method comprising:
    transmitting, by a multi-link single radio (MLSR) station (STA), preferred link information related to a second link to an access point (AP) multi-link device (MLD) in a first link, wherein the MLSR STA is not able to transmit and receive simultaneously in different links, and the MLSR STA includes a first receiver and a second receiver;
    receiving, by the MLSR STA, an initial control frame from the AP MLD through the first receiver in the second link; and
    receiving, by the MLSR STA, a data frame from the AP MLD through the first and second receivers in the second link.

2. The method of claim 1, wherein when the first receiver receives the initial control frame in the second link, the second receiver performs monitoring for signal reception in the first link.

3. The method of claim 1, wherein the preferred link information includes first preferred link information for downlink and second preferred link information for uplink.

4. The method of claim 1, wherein the preferred link information is included in a block acknowledgment (BA) frame.

5. The method of claim 1, further comprising:
    receiving a trigger frame requesting preferred link information from the AP MLD, wherein the preferred link information is included in a trigger based physical protocol data unit (PPDU).

6. The method of claim 1, wherein the preferred link information includes information related to whether or not the first link to which the preferred link information is transmitted is a preferred link of the MLSR STA.

7. The method of claim 1, wherein the preferred link information is included in a multi-STA block acknowledgment (BA) frame, and the multi-STA BA frame includes an association identifier (AID)-11 field,
wherein the multi-STA BA frame includes the preferred link information based on the AID-11 field indicating a preset specific value.

8. A multi-link single radio (MLSR) station (STA) of a wireless local area network (WLAN) system, the MLSR STA comprising:
a transceiver for transmitting and receiving radio signals; and
a processor coupled to the transceiver,
wherein the MLSR STA is not able to transmit and receive simultaneously in different links, and the MLSR STA includes a first receiver and a second receiver,
wherein the processor is adapted to:
transmit preferred link information related to a second link to an access point (AP) multi-link device (MLD) in a first link;
receive an initial control frame from the AP MLD through the first receiver in the second link; and
receive a data frame from the AP MLD through the first and second receivers in the second link.

9. The MLSR STA of claim 8, wherein when the first receiver receives the initial control frame in the second link, the second receiver performs monitoring for signal reception in the first link.

10. The MLSR STA of claim 8, wherein the preferred link information includes first preferred link information for downlink and second preferred link information for uplink.

11. The MLSR STA of claim 8, wherein the preferred link information is included in a block acknowledgment (BA) frame.

12. The MLSR STA of claim 8, wherein the processor is further configured to:
receive a trigger frame requesting preferred link information from the AP MLD, wherein the preferred link information is included in a trigger based physical protocol data unit (PPDU).

13. The MLSR STA of claim 8, wherein the preferred link information includes information related to whether or not the first link to which the preferred link information is transmitted is a preferred link of the MLSR STA.

14. The MLSR STA of claim 8, wherein the preferred link information is included in a multi-STA block acknowledgment (BA) frame, and the multi-STA BA frame includes an association identifier (AID)-11 field,
wherein the multi-STA BA frame includes the preferred link information based on the AID-11 field indicating a preset specific value.

* * * * *